G. W. McCANN.
Liquid Measure.
No. 66,371. Patented July 2, 1867.
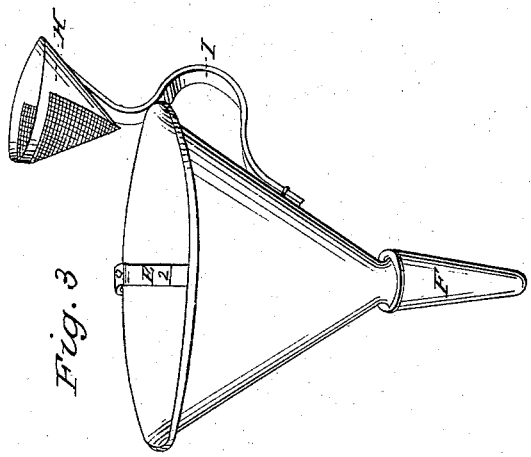
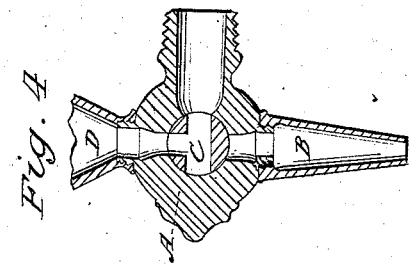
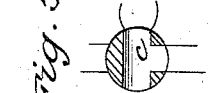
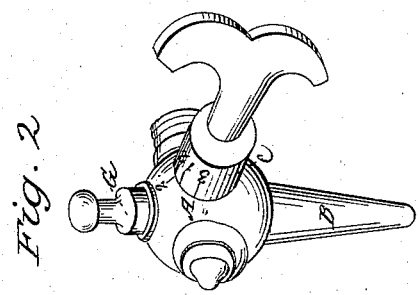
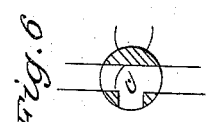
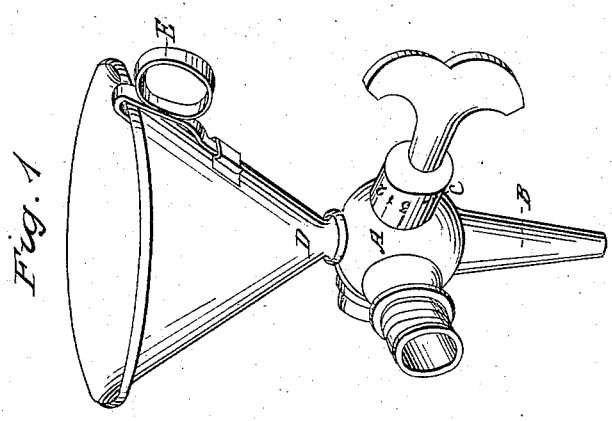
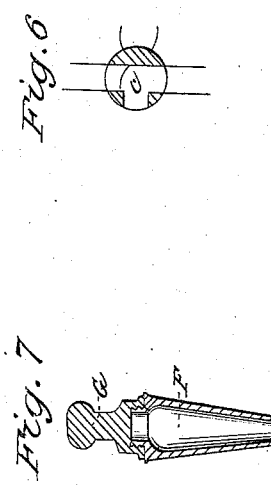
Witnesses:
Philip C. Dieterich
Andaue Whitby
Inventor:
Geo. W. McCann
By his Atto
R. D. C. Smith

United States Patent Office.

GEORGE W. McCANN, OF SPRINGFIELD, OHIO.

Letters Patent No. 66,371, dated July 2, 1867.

---

IMPROVEMENT IN COMBINED MEASURE FUNNEL AND FAUCET.

---

The Schedule referred to in these Letters Patent and making part of the same.

---

TO ALL WHOM IT MAY CONCERN:

Be it known that I, GEORGE W. McCANN, of Springfield, in the county of Clark, and State of Ohio, have invented a new and useful Combined Funnel and Measure Faucet; and I do hereby declare the following to be a full, clear, and exact description of the same, reference being had to the accompanying drawings, in which—

Figure 1 is a perspective view of my faucet and funnel as combined for joint operation as a measuring faucet.
Figure 2 shows the faucet with funnel measure removed.
Figure 3 shows the implement as a funnel merely.
Figure 4 is a vertical longitudinal section of the faucet and attachments.
Figures 5 and 6 exhibit different positions of the plug.
Figure 7 is a section of spare nozzle and cap.

My invention consists in the combination of two useful and common implements in such a manner that they may be used jointly or separately as may be desired. By this combination I am enabled to draw liquid from a vessel, and accurately measure the same, without the use of a separate measure; or if I desire to draw the liquid in the usual way, without passing it through the measuring apparatus, I can do so, or I can detach the funnel in a moment, and use it as an ordinary funnel.

That others may understand my invention, its construction and operation, I will particularly describe it.

A is the faucet, of the kind known as "three-way;" that is, the passage through the plug has three outlets instead of two, and the liquid may therefore be passed through it in either one of three different ways: it may pass from the reservoir into the faucet, and be discharged upward or downward, or it may pass directly downward through the plug without communicating with the contents of the reservoir. These operations are rendered plain by reference to figs. 4, 5, and 6. This faucet has the ordinary discharge-nozzle B beneath the plug C, and on the upper side of the head, directly above the plug, is the funnel D, connected with the head by a screw-thread, so that it can be readily removed. In connection with the funnel D is the detachable gauge E, which enables me to use the funnel as a measure, and this is always to be used when the faucet is used in connection with the funnel. It is quite evident, however, that any other species of gauge hitherto used in connection with a funnel may be employed in this case. When I desire to use the funnel separately, I unscrew it from the faucet, and screw on the spout F, which I provide for the purpose, or the spout B may be fitted so as to serve in place of F, if necessary, and the two may be made of different sizes, so that the funnel may be provided with two spouts, one suitable for larger orifices than the other. When I remove the funnel D, I screw on its seat the cap G, to prevent accident if the plug is turned in the wrong direction. When using this implement as a funnel, it is sometimes desirable to have a strainer. I have therefore attached the straining-cup H, which may be removed at pleasure. It is attached by means of the arm I, which is inserted at its lower end into a loop soldered to the outer side of the funnel. This strainer is constructed by providing a triangular piece of sheet metal and a similarly-shaped piece of wire gauze, bending these pieces in a concave form and then soldering the edges together, so as to form a conical cup, H, into which liquid may be poured and discharged toward the centre of the funnel.

When I desire to measure the liquid which passes through the faucet, the plug is turned into the position shown in fig. 4. The liquid then flows up into the funnel, and when it has reached the proper gauge-mark, the plug is turned to the position shown in fig. 6, when the flow from the reservoir is cut off, and the liquid contained in the funnel will be permitted to flow down through the spout B. If a direct flow from the reservoir is desired, then the plug is brought to the position shown in fig. 5. When the plug is in the position shown in fig. 6, the reservoir is cut off, and, as is apparent, the faucet may be used as an ordinary funnel without detachment of its parts, and such a use may be frequently unobjectionable.

Having described my invention, what I claim as new, and desire to secure by Letters Patent, is—

1. The combined faucet and funnel herein described, constructed so that the same may be used in connection or separately.

2. In combination with the funnel D, the conical strainer H, constructed and arranged as set forth.

GEO. W. McCANN.

Witnesses:
THOS. S. BINKARD,
CYRUS L. ZIEGLER.